United States Patent Office 3,157,682
Patented Nov. 17, 1964

3,157,682
OIL-SOLUBLE LIQUID CHELATE COMPOUNDS
AND THEIR PREPARATION
Hugh E. Ramsden, Scotch Plains, N.J., assignor to Esso
Research and Engineering Company, a corporation of
Delaware
No Drawing. Filed Nov. 4, 1960, Ser. No. 67,171
3 Claims. (Cl. 260—429)

This invention relates to new compositions of matter and the processes for preparing these novel compositions. More particularly, this invention concerns new and useful liquid hydrocarbon-soluble metal organic chelate compounds which are especially useful as petroleum fuel additives and the process of preparing these compounds.

Heretofore it has been proposed to use metallic β-diketones and their ester derivatives such as metal acetylacetates and the like as hydrocarbon additives to promote efficient combustion of fuels and lubricating oils in internal combustion engines, and to improve the combustion characteristics of relatively nonvolatile fuels such as fuel oil, diesel oil, bunker oils, and the like. The β-keto ester metallic chelates proposed in the past have possessed certain properties which have limited their utilization as additives. Some of these limitations are associated with the fact these metallic β-keto ester chelates have been in the past of limited solubility in hydrocarbons. Various solubilizing and emulsification agents were required to incorporate these chelates into the desired hydrocarbon medium. In addition, these chelates have normally been solids or disposed to hydrolyze to solids, so as to create additional stability problems in their use in liquid hydrocarbons. Recent efforts to improve the properties of these metallic organic chelates have included the furnishing of hydrogen ions to retard hydrolysis, azeotropic distillation to remove water, heating the compound above a certain temperature to transform their physical state and chemical structure, and other methods of improving stability and solubility. None of these methods have proven to be wholly effective.

An object of this invention is to provide new organic chelate compositions of matter and processes for obtaining the same, which compositions are liquids and hydrocarbon soluble. An additional object of this invention is to provide fuel compositions having incorporated therein the liquid metallic β-keto ester chelate material of the invention. A further object is to provide gasoline compositions having minor amounts of liquid metallic oil-soluble β-keto ester chelate material of the invention incorporated therein as primary and supplemental antiknock agents. Other objects of this invention will be apparent from the ensuing description.

It has been discovered that the reaction of an ionic metal salt in an aqueous medium with a metallic acid acceptor or base and a β-keto ester solution forms a novel liquid oil-soluble metallic chelate material of the β-keto ester. The presence of water or other ionizing medium like pyridine to form the metallic chelate is critical to the chelation reaction apparently, since the reaction steps leading to the chelate are ionic. After the formation of the chelate, the removal of the water is desirable to prevent side reactions and hydrolysis effects. The beneficial removal of the chelate from the water phase can be accomplished by distillation, extraction by solvent, and other well known means, but is preferably accomplished by the use in the reaction of an excess of an alcohol with the β-keto ester, especially an alcohol of the particular β-keto ester employed in the chelate reaction. It is preferred that the pH of the reaction solution be slightly acid, with the maintenance of a pH range of 4.5 to 7.0 being especially effective. In many cases, the desired liquid oil-soluble product is obtained accompanied by an oil-insoluble solid product. The ratio of the oil-soluble to insoluble product is believed to depend in part upon the particular metal used and the rate of reaction of the metal with the enol form of the β-keto ester. This solid product is gradually converted in the reaction medium to the desired oil-soluble liquid chelate material of the invention. Although the above process is applicable to all metals, certain variations of the basic process are especially suited for particular metals.

The metals suitable for conversion into the liquid oil soluble metal chelates of the invention are metallic elements of group IA, that is, lithium, sodium, potassium, rubidium, cesium, and francium; the elements of group IB, namely, copper, silver and gold; the elements of group IIA, to wit: beryllium, magnesium, calcium, strontium, barium and radium; the group IIB elements, that is, zinc, cadmium; the metallic elements of group IIIA, namely, aluminum, gallium, indium and thallium; the elements of group IIIB being scandium, yttrium, lanthanum including the lanthanide series of rare earth elements having atomic numbers from 57 and 59 to 71 inclusive, and the actinide series including actinium and the elements of this series having atomic numbers of 90 or more. The compositions of this invention can contain as the metallic element, the metals of group IVA, namely, germanium, tin and lead; the group IVB elements, to wit: titanium, zirconium and hafnium; the metals of group VA, that is, antimony and bismuth; the group VB elements, vanadium, niobium (columbium), and tantalum; the elements of group VIB, chromium, molybdenum and tungsten; the elements of group VIIB, that is, manganese, technetium and rhenium; and, furthermore, the elements of group VIII, that is, the elements iron, ruthenium, osmium, cobalt, rhodium, iridium, nickel, palladium and platinum.

The metals of copper (cupric and cuprous), nickel (nickelous), cobalt (cobaltous), manganese, lanthanum, praseodymium, neodymium, samarium, zinc, chromium, tin, iron, magnesium, calcium, strontium, barium, and lead are particularly suitable for the preparation of the novel chelates with the elements of copper, nickel, cobalt, manganese, lanthanum, praseodymium, neodymium, samarium, and barium especially suitable due to their ease of formation and their utility as primary and supplementary antiknock additives in fuel compositions and other uses.

The β-keto esters employed in preparing the oil-soluble liquid metallic β-keto ester chelates of this invention are those having the formula:

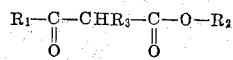

This particular method is suitable for preparing all the liquid chelates of the invention, but particularly suitable in preparing the β-keto ester chelates of metals such as copper, nickel, cobalt, barium, calcium, strontium, and manganese.

Side products to be expected in the above preparations are the metal oxide and hydroxide from incomplete chelation, carbonates when sodium carbonate is used, and possibly solid metal acetoacetates. In some reactions, an unexpected, completely insoluble, side product has been found, which product has a metal content intermediate to that of the chelate and that of the oxide.

The preparation of some of the novel oil-soluble liquid metallic chelates of this invention was carried out as follows:

EXAMPLE I.—CUPRIC BIS (ISOOCTYL ACETO-ACETATE), BIS (ISOOCTYL ACETOACETATO-) COPPER

Two moles of cupric sulfate pentahydrate (499.4 g.) were placed in a five liter four neck flask, equipped with an anchor stirrer, reflux condenser, and dropping funnel. To this was rapidly added 4 moles of isooctyl acetoacetate in excess isooctyl alcohol (prepared by ester interchange from 10 moles of ethyl acetoacetate, 3330 ml. of $C_8$ oxo alcohols, and 7 pellets of sodium hydroxide heated with removal of ethyl alcohol until the pot temperature reached 170° C. One mole of $C_8$ oxo acetoacetate is contained in 417 ml. of final solution), 1670 ml. This mixture was stirred and a solution of 3.2 moles of sodium hydroxide in 1200 ml. of water was dropped in over a period of 16 hours. A very deep green organic layer with a light blue precipitate and a very light blue aqueous phase resulted. The whole was filtered, the layers separated, the organic layer allowed to stand in an open beaker for 24 hours. The precipitate was air dried.

The product was the organic layer, a deep green oil, analyzing 3.08% copper and weighing 1487 grams. The precipitate weighed 182.3 grams, and contained 42.03% copper.

EXAMPLE II.—COBALTOUS BIS (ISOOCTYL ACETOACETATE)

Two moles of cobaltous chloride hexahydrate (475.9 g.) and four moles of isooctyl acetoacetate in excess isooctyl alcohol (1612 ml.; 403 ml.=1 mole) were treated by stirring and the slow addition of 3.6 moles of sodium hydroxide in 1200 ml. of water. The addition took 10 hrs. 51 mins. The whole was filtered, the layers separated. The organic layer, which was the product, was a deep rose colored oil, weighing 1210 grams, and analyzing 3.16% cobalt. The precipitate weighed 156.8 grams. It was pink in color and analyzed 37.91% cobalt.

EXAMPLE III.—NICKELOUS BIS (ISOOCTYL ACETOACETATE)

One-half mole (118.8 g.) of nickelous chloride hexahydrate and one mole (420 ml.) of isooctyl acetoacetate were stirred (in a two liter 4 neck flask). To this, 0.8 mole (32.0 g.) of sodium hydroxide in 300 ml. of water was added over a period of 5 hrs. 18 mins. Stirring was continued for a period of one hour. The mixture was put into a separatory funnel and allowed to stand for 24 hours. The layers were separated. The product, the organic layer, was a dark green oil which weighed 360 grams and analyzed 5.77% nickel. No precipitate was found.

EXAMPLE IV.—MANGANOUS BIS (ISOOCTYL ACETOACETATE)

To two moles (395.8 g.) of manganous chloride tetrahydrate and four moles (1620 ml.) of isooctyl acetoacetate in excess isooctyl alcohol in a stirred five liter flask was added 3.6 moles (144 g.) of sodium hydroxide in 1200 ml. of water over a period of 7 hrs. 55 mins. The mixture was then stirred for about 3 hrs. and allowed to stand. One liter of the bottom (aqueous) layer was siphoned out, the remainder of the mixture was filtered and the layers separated. The aqueous layer and the precipitate were extracted with benzene, the benzene extracts evaporated and the extract residue added to the organic product layer. This layer was a very dark brown oil which weighed 1375 grams. A very small precipitate of 49.1 grams was obtained.

EXAMPLE V.—LANTHANUM TRIS (ISOOCTYL ACETOACETATE)

To one-half mole (122.7 g.) of lanthanum trichloride and 1.5 moles (600 ml.) of isooctylacetoacetate in excess isooctyl alcohol was slowly added 0.9 mole (36.0 g.) of sodium hydroxide in 400 ml. of water. This addition took 2 hrs. 23 mins. Then 0.4 mole (49.0 g.) of sodium acetate in 200 ml. of water were rapidly added (7 mins.). The mixture was stirred for about five hours, water siphoned out, and the residual mixture filtered. The layers were separated. The organic product layer was a viscous light amber oil which weighed 544.7 grams and analyzed 7.25% lanthanum. No precipitate was found. Filtration was used to break the emulsion.

EXAMPLE VI.—NICKELOUS $C_8$ OXO ACETOACETATE

Nickelous chloride hexahydrate (475.4 grams) was dissolved in 1200 ml. of water and a homogeneous solution of 1600 ml. of $C_8$ oxo acetoacetate plus an excess of $C_8$ oxo alcohol in 144 grams of sodium hydroxide and 1200 ml. of water was added to the nickelous chloride. The reaction was instantaneous and a blue-green color formed, which rapidly changed to a light green slurry of semisolids. The solids separated slowly from the liquid layer remaining with a dark green top liquid layer. The solution was allowed to stand overnight. After this, most of the semisolids had dissolved. The two liquid layers were separated, and the oil soluble layer was filtered. The analysis showed 6.11% nickel in the oil product.

EXAMPLE VII.—PRASEODYMIUM $C_8$ OXO ACETOACETATE

Praseodymium nitrate (97 grams) was dissolved in 250 ml. of water. Sodium hydroxide (32 grams) was dissolved in 200 ml. of water, and ice was added to cool this solution. To the sodium hydroxide was added 356.4 grams of $C_8$ oxo acetoacetate/$C_8$ oxo alcohol mixture. This formed a completely homogeneous solution. The homogeneous solution was added slowly to the praseodymium nitrate solution and stirred. Reaction was instantaneous. The solution changed from green to green-yellow, and green-yellow semisolids formed over a watery bottom layer. The solution was allowed to stand overnight, after which it had completely liquefied. There were two layers. The top oil-soluble layer was separated and filtered. The analysis showed 10.7% praseodymium as metal in the product.

All the above-described β-keto ester metal chelates are obtained as liquids miscible with hydrocarbon mediums in nearly all proportions, i.e., being soluble to the extent of at least 0.1 gram of metallic chelate material in 1 gram of benzene.

EXAMPLE VIII

Following the methods described, the following $C_8$ oxo acetoacetate liquid oil-soluble metallic chelates were prepared as previously described.

Table I.—Preparation of Metallic Liquid Oil-Soluble β-Keto Esters

| Metal | Salt | Moles | Method | Base | Theory | Second base | Theory | Wt., grams | Metal, wt. percent [1] |
|---|---|---|---|---|---|---|---|---|---|
| Barium | BaCl$_2$·2H$_2$O | | H | NaOH | 0.9 | | | 341.5 | 12.4 |
| Cadmium | CdCl$_2$·2H$_2$O | | E pyridine | NaOH | 0.9 | | | 286.3 | 4.9 |
| Calcium | Ca(OH)$_2$ | | E | | | | | 274.1 | 4.18 |
| Chromium | CrCl$_3$·6H$_2$O | 2.0 | E | NaOH | 0.9 | | | 1,864.8 | 1.44 |
| Cobalt | {COCl$_2$·6H$_2$O | 0.5 | E | NaOH | 0.8 | | | 351.9 | 3.78 |
|  | {COCl$_2$·6H$_2$O | 2.0 | E | NaOH | 0.9 | | | 1,210.0 | 3.16 |
|  | {CuCl$_2$(C$_{10}$AcAc) | 0.5 | E | NaOH | 0.9 | | | 264.0 | 5.25 |
|  | {CuSO$_4$·5H$_2$O | 0.5 | E | NaOH | 0.9 | | | 170.3 | 5.74 |
| Copper | {CuSO$_4$·5H$_2$O | 0.5 | E | NaOH | 0.8 | | | 268.5 | 1.24 |
|  | {CuSO$_4$·5H$_2$O | 2.0 | E | NaOH | 0.8 | | | 1,487.0 | 3.08 |
|  | {CuSO$_4$·5H$_2$O | 2.0 | E | NaOH | 0.8 | | | 1,390.0 | 3.15 |
|  | {Cu$_2$Cl$_2$ | 0.5 | E | NaOH | 0.9 | | | 318.5 | 3.46 |
| Lanthanum | {LaCl$_3$ | 0.5 | E | NaOH | 0.6 | | | 472.7 | 6.23 |
|  | {LaCl$_3$ | 0.5 | F | NaOH | 0.6 | Na Acetate | 0.4 | 544.7 | 7.25 |
| Magnesium | MgSO$_4$ | | E | NaOH | 0.6 | | | 326.4 | 1.84 |
| Manganese | {MnCl$_2$·4H$_2$O | 2.0 | E | NaOH | 0.9 | | | 1,331.6 | 1.41 |
|  | {MnCl$_2$·4H$_2$O | 2.0 | E | NaOH | 0.9 | | | 1,375.0 | 5.18 |
| Neodymium | {NdCl$_3$·6H$_2$O | | E | NaOH | 0.6 | | | 350.9 | 9.19 |
|  | {NdCl$_3$·6H$_2$O | | E | NaAc | 0.4 | | | 350.9 | 9.19 |
|  | {NiCl$_2$·6H$_2$O | 0.5 | E | NaOH | 0.8 | | | 360.0 | 5.77 |
| Nickel | {NiCl$_2$·6H$_2$O | 2.0 | E | NaOH | 0.8 | | | 746.0 | 3.6 |
|  | {NiCl$_2$·6H$_2$O | | H | NaOH | 0.9 | | | 282.4 | 7.86 |
| Praseodymium | Pr(NO$_3$)$_3$ | | H | NaOH | 0.9 | | | 299.5 | 10.7 |
| Samarium | Sm(NO$_3$)$_3$ | | H | NaOH | 0.7 | | | 238.5 | 8.98 |
| Silver | AgNO$_3$ | | H | NaOH | 0.9 | | | 264.8 | 0.51 |
| Strontium | Sr(NO$_3$)$_2$ | | E | NaOH | | | | 330.0 | 6.29 |
| Thorium | Th(NO$_3$)$_4$·4H$_2$O | | H | NaOH | 0.9 | | | 200.0 | 11.5 |
| Tin(ous) | SnCl$_2$·2H$_2$O | | E | Na$_2$SO$_4$ | 1.0 | | | 311.3 | 3.44 |
| Uranium (UO$_2$) | UO$_2$(NO$_3$)$_2$·6H$_2$O | | E | NH$_4$OH | 1.0 | | | 346.7 | 3.62 |
| Yttrium | YCl$_3$ | | E | NaOH | 0.6 | NaAc | 0.4 | 491.7 | 2.73 |

[1] Weight percent of metal in liquid oil soluble chelate material.

It has further been discovered that the novel liquid oil-soluble metal chelates of the invention are particularly useful as additives to various liquid hydrocarbons boiling from 75° F. to 750° F., especially petroleum hydrocarbon fuel such as motor and aviation gasoline, jet fuel, diesel fuel, light distillates, fuel oil, gas oil, lubricating oil, and the like. The minor amount of the liquid oil-soluble metal chelate to be employed in liquid hydrocarbons is dependent upon the nature of the hydrocarbon and the manner and extent to which said hydrocarbon is to be improved. The metal chelate material of this invention are significantly effective combustion chamber deposit modifiers and supplementary antiknock additives when incorporated into petroleum fuels in minor amounts. Suitable concentrations that are particularly effective in gasoline when the additives are used as primary antiknock agents are amounts from 0.01 to 1.5 grams of metal per gallon of fuel. The chelates of copper, nickel and cobalt possess particularly good primary antiknock properties. The copper and cobalt chelates are also very effective supplemental antiknock agents at a very low metal concentration with primary alkyl and alkenyl lead antiknock additives such as tetraethyl lead, tetramethyl lead, diethyl dimethyl lead, tetravinyl lead, dimethyl divinyl lead, and the like. When utilized as supplementary antiknock agents with lead compounds in concentrations of from 0.5 to 4.5 cc. per gallon, amounts of the metal chelates from 0.030 to 0.5 grams per gram of lead are effective, with the amounts of from 0.033 to 0.1 especially effective.

Besides being incorporated directly as an additive in the leaded and unleaded gasoline, it is also within the contemplation of this invention to incorporate the liquid oil-soluble metal chelates of the instant invention in concentrated additive solutions comprising gasoline, antiknock additives, and halogenated scavenger agents, which solutions are subsequently added to motor fuel to produce total fuel compositions having the heretobefore described concentrations of primary and/or supplementary antiknock agents, and halogenated scavenger agents.

A suitable concentrate for this purpose is as follows:

| | Percent |
|---|---|
| Gasoline | 50 |
| Tetraethyl lead | 22.4 |
| Ethylene dichloride | 6.3 |
| Ethylene dibromide | 6.3 |
| Cu C$_8$ oxo acetoacetate solution (3% Cu conc.) | 15.0 |

The motor fuels and more particularly the gasoline in which the octane promoters of the present invention may be utilized, are conventional gasolines for use in internal combustion engines. Such gasolines are supplied in a variety of grades, depending upon the particular service or use for which they are intended. The most general classifications applied to such fuels are those of motor gasolines and aviation gasolines. Motor gasolines are defined by ASTM Specification D-439-56T. Such fuels consist of mixtures of hydrocarbons of various types, including aromatics, olefins, paraffins, isoparaffins, naphthenes, and in some cases, diolefins derived from petroleum by refining processes, such as fractional distillation, thermal cracking, catalytic cracking, hydroforming, alkylation, isomerization and solvent extraction. Motor gasolines normally boil between about 80° F. and about 450° F. when tested by ASTM Method D-86. Their vapor pressures as determined by ASTM Method D-323 vary, depending on the season of the year during which they are to be used, from about 7 to about 15 p.s.i. at 100° F. Their octane numbers, as determined by ASTM Method D-908, may range from about 83 to about 105 or higher. Aviation gasolines are prepared by blending of constituents similar to those found in motor gasolines, but, in general, have somewhat narrower boiling ranges between 100° F. and 330° F., and somewhat more rigid specifications than do motor gasolines. Specifications for aviation gasolines are set forth in U.S. Military Specifications MIL-F-5572.

It is contemplated that the antiknock agents of the instant invention may be utilized in conjunction with scavenging agents, and in particular halogenated scavenging agents. Halogenated hydrocarbon compounds suitable for use as scavenger agents in gasolines containing lead antiknock agents are, in general, those boiling within the range between about 50° C. and about 250° C. Mixtures of the above and similar halogenated compounds may also be employed. Ethylene dibromide, ethylene dichloride and mixtures thereof are particularly effective as scavenger agents for lead antiknock compounds and are generally used therewith and may similarly be employed with the antiknock additives and the supplementary additives of the instant invention.

Halogenated scavenger agents such as those set forth above are normally employed in gasolines containing lead antiknock agents in concentrations ranging from about 0.5 to about 3.0 theories, one theory being the amount of scavenger stoichiometrically equivalent to the lead in the gasoline. One theory of ethylene dichloride, for example, is the amount of the scavenger required to provide sufficient chlorine atoms to react stoichiometrically with all of the lead in the gasoline to form lead chloride. In gasolines containing lead antiknock agents, such as lead tetraethyl, it is generally preferred to use from about 0.8 to about 1.5 theories of ethylene dibromide if a single scavenging agent is to be employed, or from about 0.8 to about 1.5 theories of ethylene dichloride and from about 0.3 to about 0.8 theories of ethylene dibromide if a mixed scavenger agent is used.

Gasolines improved by the addition of lead antiknock additives in conjunction with the liquid oil-soluble metal chelates and particularly tetraethyl lead and the metal chelates of $C_8$ oxo acetoacetate in accordance with the present invention may contain other additive materials conventionally employed in gasolines. Such other additives include upper cylinder lubricants and solvent oils, corrosion inhibitors, gum inhibitors, 2,6-ditertiary butyl-4-methyl phenol, anti-icing agents, dye stabilizers, deposit modifying additives, and the like.

EXAMPLE IX

Laboratory octane ratings of the Motor Octane Number (MON) and the Research Octane Number (RON) were obtained in accordance with the procedure outlined in ASTM Methods D-357-59 and D-908-59. The effect of the liquid oil-soluble metal $C_8$ oxo acetoacetates of the invention as primary antiknock agents in unleaded fuels is disclosed in the following Table II.

From the above, it can be seen that the metal chelates have primary antiknock characteristics in unleaded fuels with the chelates of copper and cobalt especially demonstrating remarkable primary antiknock effectiveness, particularly in saturate-type fuel.

The following data of Table III demonstrate the effectiveness of the metal chelates of the invention as supplementary antiknock agents in leaded fuels.

*Table III.—Effect of Metal Chelates on Leaded Fuels—Primary Reference Fuel [3]*

A. 0.5 ML. OF TEL PER GALLON

|  | RON [1] | Δ RON | MON [1] | Δ MON |
|---|---|---|---|---|
| Base Fuel | 82.0 | | 84.7 | |
| Metal Chelate: | | | | |
| Copper: | | | | |
| 0.5 | 82.7 | +0.7 | 85.1 | +0.4 |
| 1.0 | 83.0 | +1.0 | 85.0 | +0.3 |
| Cobalt: | | | | |
| 0.1 | 82.5 | +0.5 | 85.2 | +0.5 |
| 0.5 | 82.9 | +0.9 | 86.0 | +1.3 |
| Nickel: | | | | |
| 0.1 | 82.4 | +0.4 | 84.7 | 0.0 |
| 0.5 | 82.7 | +0.7 | 85.2 | +0.5 |
| 1.0 | 82.6 | +0.6 | 84.9 | +0.2 |

B. 1.0 ML. OF TEL PER GALLON

|  | RON [1] | Δ RON | MON [1] | Δ MON |
|---|---|---|---|---|
| Base Fuel | 87.5 | | 89.7 | |
| Metal Chelate: | | | | |
| Copper: | | | | |
| 0.1 | 87.8 | +0.3 | 89.7 | 0.0 |
| 0.5 | 87.7 | +0.2 | 89.5 | −0.2 |
| Base [2] | 87.2 | | 88.1 | |
| Cobalt: | | | | |
| 0.1 | 87.8 | +0.8 | 89.5 | +1.4 |
| 0.5 | 87.8 | +0.8 | 89.9 | +1.8 |
| Nickel: | | | | |
| 0.1 | 87.7 | +0.5 | 89.2 | +1.1 |
| 0.5 | 87.6 | +0.4 | 89.6 | +1.5 |

See footnotes at end of table.

*Table II.—Effect of Metal Chelates on Unleaded Fuels*

A. PRIMARY REFERENCE FUEL [2]

|  | RON [1] | Δ RON | MON [1] | Δ MON |
|---|---|---|---|---|
| Base Fuel | 76.7 | | 77.0 | |
| +10 g. C₈ oxo acetoacetate/gal | 76.8 | +0.1 | 76.3 | −0.7 |
| +50 g. C₈ oxo acetoacetate/gal | 76.2 | −0.5 | 76.3 | −0.7 |
| +100 g. C₈ oxo acetoacetate/gal | 76.3 | −0.4 | 76.4 | −0.6 |
| Metal chelates (in g. of metal per gallon): | | | | |
| Copper: | | | | |
| 0.1 | 76.8 | +0.1 | 77.1 | +0.1 |
| 0.5 | 78.1 | +1.4 | 78.5 | +1.5 |
| 1.0 | 78.4 | +1.7 | 79.9 | +2.9 |
| 3.6 | 79.9 | +3.2 | 81.6 | +4.6 |
| 4.8 | 80.1 | +3.4 | 82.3 | +5.3 |
| Nickel: | | | | |
| 0.1 | 77.3 | +0.6 | 77.9 | +0.9 |
| 0.5 | 77.6 | +0.9 | 78.5 | +1.5 |
| 1.0 | 77.5 | +0.8 | 78.9 | +1.9 |
| Cobalt: | | | | |
| 0.1 | 78.2 | +1.5 | 78.6 | +1.6 |
| 0.5 | 78.5 | +1.7 | 79.9 | +2.9 |
| 1.0 | 77.9 | +1.1 | 79.4 | +2.4 |
| Manganese: | | | | |
| 0.5 | 76.8 | +0.1 | 77.0 | 0.0 |
| 1.0 | 77.0 | +0.3 | 77.4 | +0.4 |
| Lanthanum: 0.5 | 77.6 | +0.9 | 76.7 | −0.3 |

B. ISOOCTANE

|  | RON [1] | Δ RON | MON [1] | Δ MON |
|---|---|---|---|---|
| Base Fuel | 100 | | 100 | |
| Metal Chelate: | | | | |
| Copper: | | | | |
| 0.3 | 101.7 | +1.7 | 100.7 | +0.7 |
| 0.6 | 102.6 | +2.6 | 100.9 | +0.9 |
| 1.8 | 104.2 | +4.2 | 101.0 | +1.0 |
| 3.0 | 104.2 | +4.2 | 100.1 | +0.1 |
| Cobalt: | | | | |
| 0.3 | 102.3 | +2.3 | 101.4 | +1.4 |
| 0.6 | 102.5 | +2.5 | 101.6 | +1.6 |
| 1.3 | 101.4 | +1.4 | 101.3 | +1.3 |
| 1.9 | 101.7 | +1.7 | 101.3 | +1.3 |
| Manganese: | | | | |
| 1.0 | 100.1 | +0.1 | 100.3 | +0.3 |
| 3.0 | 99.9 | −0.1 | 100.2 | +0.2 |

[1] Average of three determinations.
[2] Composition: 77% isooctane, 23% heptane.

Table 3—Continued
C. 3.0 ML. OF TEL PER GALLON

| | | | | |
|---|---|---|---|---|
| Base Fuel | 94.1 | | 85.8 | |
| Metal Chelate: Copper: | | | | |
| 0.1 | 95.1 | +1.0 | 96.6 | +0.8 |
| 0.5 | 95.4 | +1.3 | 96.6 | +0.8 |
| 1.0 | 95.3 | +1.2 | 95.0 | −0.8 |

[1] Average of three determinations.
[2] A new base; used for these next determinations.
[3] Primary reference fuel composition: 77% isooctane, 23% heptane.

From the above, it can be seen that the chelates are effective supplementary antiknock additives at very low concentrations with the copper chelate being especially effective.

The novel liquid oil-soluble metal chelates prepared by this invention have application as stabilizers for plastics and halogen-containing materials, such as polyvinyl chloride, especially the barium, calcium, strontium, zinc, tin, and cadmium derivatives; as high temperature stabilizers in lubricating oils; as catalysts for the low temperature set of polyesters and the like, especially the cobalt, manganese, zinc, nickel and iron derivatives; as oxidation carriers for oxidation applications, for example, the use of the cobalt derivative in paint drier; as fungicides, wood preservatives, and antimildew agents, especially the copper and nickel derivatives; as catalysts in hydrogenation reactions, especially the rare earth derivatives; as soluble sources for metallizing dyes for dyeing fibers such as polypropylene and other synthetic fibers; as catalysts for the oxidation of alkyl aromatics or oxonation of olefins, especially the cobalt derivative; and so forth.

What is claimed is:

1. A process for making liquid metal organic chelates comprising admixing a β-keto ester with an aqueous basic solution containing from 50 to 98% by weight of the theoretical base, said β-keto ester having the formula:

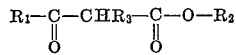

in which $R_1$ and $R_2$ are organic radicals containing from 1 to 30 carbon atoms each, and which are selected from the group consisting of alkyl, cycloalkyl, aralkyl, aryl, and alkaryl radicals, and $R_3$ is an organic radical selected from the group of hydrogen and an alkyl radical having from 1 to 12 carbon atoms; reacting said basic ester solution with an ionic metal salt in the theoretical quantity necessary to form the β-keto ester chelate of the metal; and recovering a liquid oil-soluble metal β-keto chelate compound from the non-aqueous layer of the solutions.

2. A process according to claim 1 wherein the basic ester solution contains an aliphatic alcohol having from 3 to 30 carbon atoms per molecule, said alcohol being present in an amount between 0.25 and 2.5 moles per mole of the said β-keto ester.

3. A process for making liquid metal chelates consisting of admixing a $C_6$–$C_{18}$ alkyl ester of acetoacetic acid with from 0.25 to 2.5 moles of a $C_6$–$C_{18}$ alkyl alcohol per mole of ester with from 90 to 98% by weight of an aqueous solution of a water soluble metallic base compound wherein the metal is selected from the group consisting of alkali and alkaline earth metals and said metallic base compound has an ionization constant of at least $1 \times 10^{-6}$ at 20° C., reacting said solution with a theoretical quantity of a metal salt necessary to form the metallic chelate, said metal salt having a solubility product constant of more than $1 \times 10^{-8}$ at 15° C. and recovering said oil soluble liquid metal chelate material from the non-aqueous layer of the solution.

References Cited in the file of this patent
UNITED STATES PATENTS

| | | |
|---|---|---|
| 643,280 | Weller | Feb. 13, 1900 |
| 2,151,432 | Lyons | Mar. 21, 1939 |
| 2,632,763 | Hagemann | Mar. 24, 1953 |
| 2,894,805 | Werner et al. | July 14, 1959 |
| 2,922,801 | Kaizerman et al. | Jan. 26, 1960 |
| 2,926,184 | Irish et al. | Feb. 23, 1960 |
| 2,933,380 | Kegelman | Apr. 19, 1960 |
| 2,936,224 | Fontana | May 10, 1960 |
| 2,948,747 | Karbum et al. | Aug. 9, 1960 |
| 2,989,556 | Dixon et al. | June 20, 1961 |